Patented Apr. 14, 1953

2,635,074

UNITED STATES PATENT OFFICE 2,635,074

REMOVAL OF OXIDIZABLE CONTAMINANTS FROM ALCOHOLS

Alfred Steitz, Jr., Tulsa, Okla., assignor to Stanolind Oil and Gas Company, Tulsa, Okla., a corporation of Delaware No Drawing. Application September 24, 1949, Serial No. 117,713

9 Claims. (Cl. 202—57)

The present invention relates to the purification of alcohols and more particularly, it pertains to a procedure for the removal of oxidizable contaminants therefrom.

It is known that synthetically or biochemically produced alcohols generally possess certain oxidizable contaminants, the last traces of which are substantially impossible to remove even by means of highly efficient fractionating columns. The presence of such contaminants is highly objectionable where alcohols containing these impurities are employed in the preparation of film-forming compositions because of the fact that, on standing, the resulting film tends to discolor. Moreover, these contaminants, under ordinary conditions, oxidize to produce compounds having a disagreeable odor and which impart undesirable properties to the alcohol. Ethanol containing these oxidizable contaminants is likewise exceedingly undesirable for use as a fortification or blending agent in the manufacture of alcoholic beverages owing to the characteristic disagreeable odor and flavor which such contaminants impart thereto. Because of the obvious advantages of alcohols which have these undesirable contaminants removed, it has long been the desire of alcohol manufacturers to find an economical and efficient method for accomplishing this object. This is especially true in the case of ethanol where spirit grade alcohol, i. e., ethanol having a permanganate time of at least 45 minutes, commands premium prices.

In U. S. Patent 1,987,601, granted to J. P. Burke, it has been proposed to remove contaminants such as aldehydes from alcohols of the type included within the scope of the present invention, for example, by refluxing a mixture of the crude alcohol with an acid salt of a primary amine such as ethylamine or aniline so that the amine may react with the aldehydes present and thereafter recovering a distillate of alcohol having a substantially reduced concentration of aldehydes. While the foregoing procedure may render alcohols suitable for numerous uses, it is wholly ineffective to yield alcohols of the spirit grade variety.

Accordingly, it is an object of my invention to provide a process by which oxidizable impurities of the type normally found in alcohols such as, for example, methanol, ethanol, 1-propanol, isopropyl alcohol, and the like, may be completely removed therefrom by treatment of the contaminated alcohol with a relatively small quantity of a hydrazine compound. It is another object of my invention to provide a method for further removing said oxidizable contaminants from alcohols in which the aldehyde concentration thereof is sufficiently low to give a negative fuchsin test. It is a further object of my invention to provide a method for obtaining high quality spirit grade ethanol by treating solutions of the latter containing the aforesaid oxidizable contaminants with said hydrazine compound and thereafter separating the ethanol in a form sufficiently pure to meet spirit grade ethanol specifications.

The exact nature or structure of the oxidizable contaminants which occur in alcohols is not accurately known. While it has previously been thought that aldehydes may be the principal objectionable impurities contained therein, I have observed that solutions of alcohols which are negative with respect to the standard fuchsin aldehyde test, i. e., alcohols containing less than five parts per million of aldehyde, give highly unsatisfactory permanganate times, viz., of the order of 5 to 6 minutes.

I have now discovered that alcohols of extremely high purity and relatively long permanganate times may be obtained by treating the contaminated alcohol, especially contaminated dilute aqueous solutions thereof, i. e., containing about 5 to 25 weight per cent alcohol, with hydrazine or derivatives thereof such as phenylhydrazine, 2,4-dinitrophenylhydrazine, and semicarbazide or mineral acid salts of these compounds, hereinafter referred to as "reagent" or "reagents."

In accordance with a preferred embodiment of my invention, hydrazine in the form of its hydrate, or any of the other reagents, is preferably added as a relatively concentrated aqueous solution to the alcohol to be treated. Thereafter the resulting mixture is distilled to obtain the pure alcohol or an aqueous azeotropic mixture thereof leaving as a still residue the relatively non-volatile products formed by the interaction of the reagent with the oxidizable contaminants.

The process of my invention is especially applicable to the purification of various water soluble alcohols obtained by the reduction of carbon monoxide with hydrogen over a fluidized promoted iron catalyst at temperatures of 500° to 700° F. and pressures of from 150 to 450 p. s. i. g. For example, in obtaining the fraction produced by the aforesaid process, the original water layer, which contains the major portion of the ethanol present, is subjected to a series of extractive distillation steps to remove the water soluble aliphatic acids, acetaldehyde, propionaldehyde, butyraldehyde, acetone, methyl ethyl ketone, methyl propyl ketone, methanol, and isopropyl alcohol. The original water layer, after the aforesaid materials have been separated therefrom, consists essentially of a dilute solution, usually about 5 weight per cent, of ethanol in water. Such a solution is normally negative to the fuchsin aldehyde test, but the ethanol obtained therefrom still is far below the standard required for a beverage or spirit grade alcohol, having a permanganate time usually not greater than 5 or 6 minutes.

Although effective removal of oxidizable contaminants may be accomplished by adding one of the aforesaid reagents directly to the dilute alcohol solution to be purified prior to the distillation step, a substantial savings may be brought about by introducing into the fractionating column a solution of the particular reagent in a suitable concentration at a point above the dilute alcohol feed line since the concentration of alcohol and contaminants increases markedly on the higher plates in the fractionating column. With dilute ethanol feeds it has been my observation that reagent charged directly to the feed in a concentration of about 100 parts per million is sufficient to effect a complete clean up of oxidizable contaminants. Similar concentrations of these reagents in less dilute ethanol effects the same degree of purification, thus the total amount of reagent required may be decreased.

The quantity of reagent employed in carrying out my process may vary and, in general, depends upon the concentration of the alcohol in the solution to be treated. Thus, with relatively dilute alcoholic solutions, i. e., 5 to 25 weight per cent, the desired reagent may be advantageously employed in concentrations of from about 0.01 to about 0.2 weight per cent. In any event, in order to effect satisfactory removal of all of the undesired oxidizable contaminants in a given solution of impure alcohol, a sufficient quantity of reagent should be added to allow at least about 0.01 to 0.1 weight per cent thereof to dissolve in the solution.

One of the surprising features of my invention resides in the fact that out of the relatively large group of compounds considered to be otherwise equivalent to the reagents herein named, I have been able to discover only four compounds capable of rendering alcohols sufficiently free from oxidizable contaminants to yield a finished product having a suitable permanganate time. Thus, of the normally reactive compounds such as the primary aromatic and aliphatic amines, for example, aniline and ethylamine which are taught by Burke U. S. Patent 1,987,601 to be effective for the purification of alcohols, I have found none to be capable of accomplishing the result desired.

The process of my invention may be further illustrated by the following example in which the marked superiority of the aforesaid reagents over aniline and ethylamine is demonstrated.

EXAMPLE

The aqueous fraction obtained by the synthesis of hydrocarbons from carbon monoxide and hydrogen was first processed to remove essentially all of the ketones, aldehydes, acids, and esters. The fraction thus obtained contained about 5 weight per cent ethanol; however, no aldehydes could be detected by test with fuchsin. The solution was divided into seven 1200 ml. samples after which aniline hydrochloride and ethlamine hydrochloride were separately added to individual samples, hydrazine in the form of an 85 per cent aqueous solution (hydrazine hydrate) was added to three of the samples, while semicarbazide hydrochloride was added to a single sample, all in the concentrations listed in the table below. The seventh sample was run as a blank. Each portion was distilled at a reflux ratio of about 40:1 and permanganate time for each 10 ml. of distillate determined. The results obtained are shown below.

Table

PERMANGANATE TIMES IN MINUTES

| Cut No. | Control | Wt. Percent Ethylamine Hydrochloride, 0.064 | Wt. Percent Aniline Hydrochloride, 0.1 | Wt. Percent Hydrazine Hydrate | | | Wt. Percent Semicarbazide Hydrochloride, 0.05 |
|---|---|---|---|---|---|---|---|
| | | | | 0.125 | 0.067 | 0.026 | |
| 1 | 1 | 7 | 1 | 55 | 39 | 50 | 41 |
| 2 | 1¼ | 12 | 1 | 59 | 43 | 49 | 54 |
| 3 | 1¾ | 19 | 1 | 62 | 50 | 54 | 54 |
| 4 | 1¾ | 10 | 1 | 53 | 44 | 47 | 55 |
| 5 | 2 | 4 | 1 | 57 | 51 | 47 | 58 |
| 6 | 2 | 2 | 8 | 55 | 46 | 46 | 56 |
| 7 | 2 | 1 | 7½ | 57 | 49 | 33 | 55 |

2,4-dinitrophenylhydrazine and phenylhydrazine when substituted for hydrazine or semicarbazide in the foregoing example and utilized in concentrations ranging preferably from about 0.06 to about 0.1 weight per cent gives ethanol having a permanganate time in excess of 45 minutes. Alcohol obtained as a result of the above treatment contains less than one-half part per million of oxidizable impurities.

From the data appearing in the table, it is evident that both aniline and ethylamine are wholly ineffective to improve the permanganate time of alcohol containing extremely small amounts of oxidizable contaminants. On the other hand, it has been demonstrated that hydrazine, certain derivatives of hydrazine, or semicarbazide are very effective in removing the last traces of objectionable oxidizable impurities to give ethanol having a sufficiently high permanganate time to meet the requirements of spirit grade alcohol.

The foregoing examples and description are to be interpreted as being only illustrative of the scope of my invention and are to be in no way regarded as limitative thereof. It will be readily apparent to those skilled in the art that the process described above is susceptible of numerous modifications without departing from the scope of the present invention. Thus, for example, mixtures of alcohols containing oxidizable contaminants may readily be purified by adding thereto any of the aforesaid reagents or mixtures of these compounds and thereafter distilling the resulting mixture to obtain the alcohols free from oxidizable impurities.

What I claim is:

1. A method for the purification of alcohols produced by the reduction of carbon monoxide with hydrogen, said alcohols being negative to the fuchsin aldehyde test but which contain impurities oxidizable by permanganate comprising mixing with the impure alcohol at least about 0.01 weight per cent of a hydrazine compound selected from the group consisting of hydrazine, 2,4-dinitrophenylhydrazine, phenylhydrazine, and semicarbazide and thereafter distilling the resulting mixture to obtain an alcohol free from said oxidizable contaminants.

2. The method of claim 1 in which hydrazine is employed.

3. The method of claim 1 in which semicarbazide is employed.

4. The method of claim 1 in which phenylhydrazine is employed.

5. A method for the purification of alcohols produced by the reduction of carbon monoxide with hydrogen, said alcohols being negative to the fuchsin aldehyde test but which contain impurities oxidizable by permanganate which comprises mixing with an aqueous solution containing 5 to 25 weight per cent alcohol together with oxidizable contaminants at least about 0.01 weight per cent of a hydrazine compound selected from the group consisting of hydrazine, 2,4-dinitrophenylhydrazine, phenylhydrazine, and semicarbazide and thereafter distilling the resulting mixture to obtain an alcohol free from said oxidizable contaminants.

6. A method for the preparation of spirit grade ethanol from dilute solutions thereof produced by the reaction of carbon monoxide with hydrogen, said solutions being negative to the fuchsin aldehyde test but which contain contaminants oxidizable by permanganate which comprises mixing with said solution at least about 0.01 weight per cent of a hydrazine compound selected from the group consisting of hydrazine, 2,4-dinitrophenylhydrazine, phenylhydrazine, and semicarbazide and thereafter distilling the resulting mixture to obtain ethanol having a permanganate time of at least 45 minutes.

7. The process of claim 6 in which hydrazine is employed.

8. The process of claim 6 in which semicarbazide is employed.

9. The process of claim 6 in which phenylhydrazine is employed.

ALFRED STEITZ, JR.

References Cited in the file of this patent

UNITED STATES PATENTS

| Number | Name | Date |
|---|---|---|
| 625,108 | Hewitt | May 16, 1899 |

OTHER REFERENCES

Shriner and Fuson: "The Systematic Identification of Organic Compounds," second edition, published 1940 by John Wiley and Sons, New York, New York. Pages 139–143, 167, 188, 221.